(12) United States Patent
Roenigk et al.

(10) Patent No.: US 12,384,538 B2
(45) Date of Patent: Aug. 12, 2025

(54) ADAPTIVE AIRDROP SYSTEM AND METHOD

(71) Applicant: HONEYWELL INTERNATIONAL INC., Charlotte, NC (US)

(72) Inventors: Karl F. Roenigk, Baltimore, MD (US); Thomas Dobbins, Plymouth, MN (US); Matthew D. Wiebold, Plymouth, MN (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 231 days.

(21) Appl. No.: 18/046,809

(22) Filed: Oct. 14, 2022

(65) Prior Publication Data
US 2024/0059414 A1 Feb. 22, 2024

Related U.S. Application Data

(60) Provisional application No. 63/371,798, filed on Aug. 18, 2022.

(51) Int. Cl.
*B64D 1/02* (2006.01)
*B64D 45/00* (2006.01)
(Continued)

(52) U.S. Cl.
CPC .............. *B64D 1/02* (2013.01); *B64D 45/00* (2013.01); *B64D 47/00* (2013.01); *G05B 17/02* (2013.01); *G01S 17/95* (2013.01)

(58) Field of Classification Search
CPC .......... B64D 1/02; B64D 45/00; B64D 47/00; G01S 17/95; G05B 17/02
See application file for complete search history.

(56) References Cited

U.S. PATENT DOCUMENTS

| 5,724,125 A | * | 3/1998 | Ames | G01S 17/58 342/107 |
| 6,808,144 B1 | * | 10/2004 | Nicolai | B64U 80/82 244/152 |

(Continued)

FOREIGN PATENT DOCUMENTS

WO   WO-2022009400 A1 * 1/2022

OTHER PUBLICATIONS

Wang, Yi, et al., "Neural Network-Based Simulation and Prediction of Precise Airdrop Trajectory Planning," Aerospace Science and Technology (120 (2022) 107302, Dec. 29, 2021, downloaded from https://www.sciencedirect.com/science/article/pii/S1270963821008129 on Jul. 26, 2022.

(Continued)

*Primary Examiner* — Babar Sarwar
(74) *Attorney, Agent, or Firm* — Ingrassia Fisher & Lorenz, LLP

(57) ABSTRACT

An adaptive airdrop system for an aircraft includes a wind measurement system and a processing system. The wind measurement system measures at least atmospheric wind velocity and supplies wind velocity data representative thereof. The processing system is configured to adaptively sample the wind velocity data, implement a computer aided release point (CARP) model, and iteratively process the adaptively sampled wind velocity data to calculate, using the CARP model, a precision release point for a payload.

11 Claims, 3 Drawing Sheets

(51) Int. Cl.
*B64D 47/00* (2006.01)
*G01S 17/95* (2006.01)
*G05B 17/02* (2006.01)

(56) References Cited

U.S. PATENT DOCUMENTS

| | | | |
|---|---|---|---|
| 8,427,649 B2 | 4/2013 | Hays et al. | |
| 8,781,719 B1 * | 7/2014 | Bernhardt | G01W 1/00 |
| | | | 701/120 |
| 8,930,049 B2 * | 1/2015 | Mamidipudi | G01S 17/95 |
| | | | 356/336 |
| 8,984,938 B1 * | 3/2015 | Bernhardt | G01P 5/20 |
| | | | 73/170.04 |
| 9,007,570 B1 * | 4/2015 | Beyon | G01S 17/95 |
| | | | 356/28 |
| 9,086,488 B2 | 7/2015 | Tchoryk, Jr. et al. | |
| 9,630,715 B2 * | 4/2017 | Takayama | B64D 1/22 |
| 10,175,359 B2 * | 1/2019 | Shapira | G01S 17/58 |
| 10,352,706 B2 | 7/2019 | Arneau et al. | |
| 10,527,724 B2 * | 1/2020 | Lodden | B64D 43/02 |
| 11,428,820 B1 * | 8/2022 | Barr | G01S 19/42 |
| 2010/0014066 A1 * | 1/2010 | Becker | G01S 17/58 |
| | | | 356/28 |
| 2014/0025238 A1 * | 1/2014 | So | B64D 1/22 |
| | | | 701/3 |
| 2014/0142788 A1 * | 5/2014 | Denton | G01W 1/00 |
| | | | 701/3 |
| 2017/0168161 A1 * | 6/2017 | Shapira | G06F 16/50 |
| 2018/0162531 A1 * | 6/2018 | Markuzon | B64D 1/08 |
| 2018/0210636 A1 * | 7/2018 | P R | G08G 5/34 |
| 2019/0120628 A1 * | 4/2019 | Parras | G08G 5/59 |
| 2019/0270522 A1 * | 9/2019 | Fields | B64D 17/62 |
| 2020/0088498 A1 * | 3/2020 | Kenney | F41G 3/08 |
| 2021/0224725 A1 * | 7/2021 | Ifill | G05D 1/101 |
| 2021/0319705 A1 * | 10/2021 | Furumoto | G08G 5/58 |
| 2021/0347460 A1 * | 11/2021 | Watters | B64B 1/62 |

OTHER PUBLICATIONS

Yang, Shiyi, et al., "Real-Time Optimal Path Planning and Wind Estimation Using Gaussian Process Regression for Precision Airdrop," 2017 American Control Conference Sheraton Seattle Hotel, May 24-26, 2017, downloaded from https://ieeexplore.ieee.org/stamp/stamp.jsp?tp=&arnumber=7963341 on Jul. 26, 2022.

* cited by examiner

ADAPTIVE AIRDROP SYSTEM AND METHOD

CROSS-REFERENCE TO RELATED APPLICATION

This application claims priority to the U.S. Provisional Application Ser. No. 63/371,798, filed Aug. 18, 2022, the entire contents of which is hereby incorporated by reference.

TECHNICAL FIELD

The present invention generally relates to computed airdrop release point (CARP) determination, and more particularly relates to a system and method for adaptively computing precise CARP for aircraft.

BACKGROUND

Currently, airdrop operations conducted by cargo aircraft require the aircraft to fly to a pre-calculated computed airdrop release point (CARP) that is based on the prior-day forecast and releases dropsondes to measure atmospheric wind velocity profile as function of altitude at points in time, wherever the sonde may drift. A go-round is maneuvered, and in a later, second pass a consolidated airdrop tool recalculates the CARP when combined with the outdated forecast and the stale dropsonde data. The new solution is manually transferred to the flight crew and entered to the flight management system (FMS), with significant latency. The crew then navigates—as best possible—with the remaining time margin (typically <minute) to reach the CARP position and prescribed aircraft state (heading, altitude, airspeed). These types of operations can result in significant errors Current airdrop approaches suffer significant drawbacks. First, aircraft must fly over the intended landing area one or more times, risking detection of intent, to measure wind and recalculate CARP. Multiple passes increases operation time and vulnerability to enemy aircraft and ground forces. Moreover, dropsonde data is not collected in the desired drop column that is needed by or representative of or optimal to models, which adds significant error to CARP solutions Hence, there is a need for a system and method that addresses the above-noted drawbacks.

BRIEF SUMMARY

The system described herein provides the ability to sample the actual expected trajectory by adaptive sampling, which offers the potential for ultimate accuracy in estimated CARP.

In one embodiment, an adaptive airdrop system includes a wind measurement system and a processing system. The wind measurement system is configured to measure at least atmospheric wind velocity and supply wind velocity data representative thereof. The processing system is in operable communication with the wind measurement system and is configured to: adaptively sample the wind velocity data, implement a computer aided release point (CARP) model, and iteratively process the adaptively sampled wind velocity data to calculate, using the CARP model, a precision release point for a payload.

In another embodiment, an adaptive airdrop system includes an ultraviolet LIDAR (UV LIDAR) system and a processing system. The UV LIDAR system is configured to measure one or more atmospheric conditions and supply atmospheric condition data representative thereof. The processing system is in operable communication with the UV LIDAR system and is configured to: adaptively sample the atmospheric condition data, implement a computer aided release point (CARP) model, and iteratively process the adaptively sampled atmospheric condition data to calculate, using the CARP model, a precision release point for a payload.

In yet another embodiment, an aircraft includes a fuselage and a precision airdrop system. The fuselage is adapted to have a payload disposed therein. The precision airdrop system is disposed within the fuselage, the precision airdrop system and includes a wind measurement system and a processing system. The wind measurement system is configured to measure at least atmospheric wind velocity and supply wind velocity data representative thereof. The processing system is in operable communication with the wind measurement system and is configured to: adaptively sample the wind velocity data, implement a computer aided release point (CARP) model, and iteratively process the adaptively sampled wind velocity data to calculate, using the CARP model, a precision release point for a payload.

Furthermore, other desirable features and characteristics of the adaptive airdrop system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
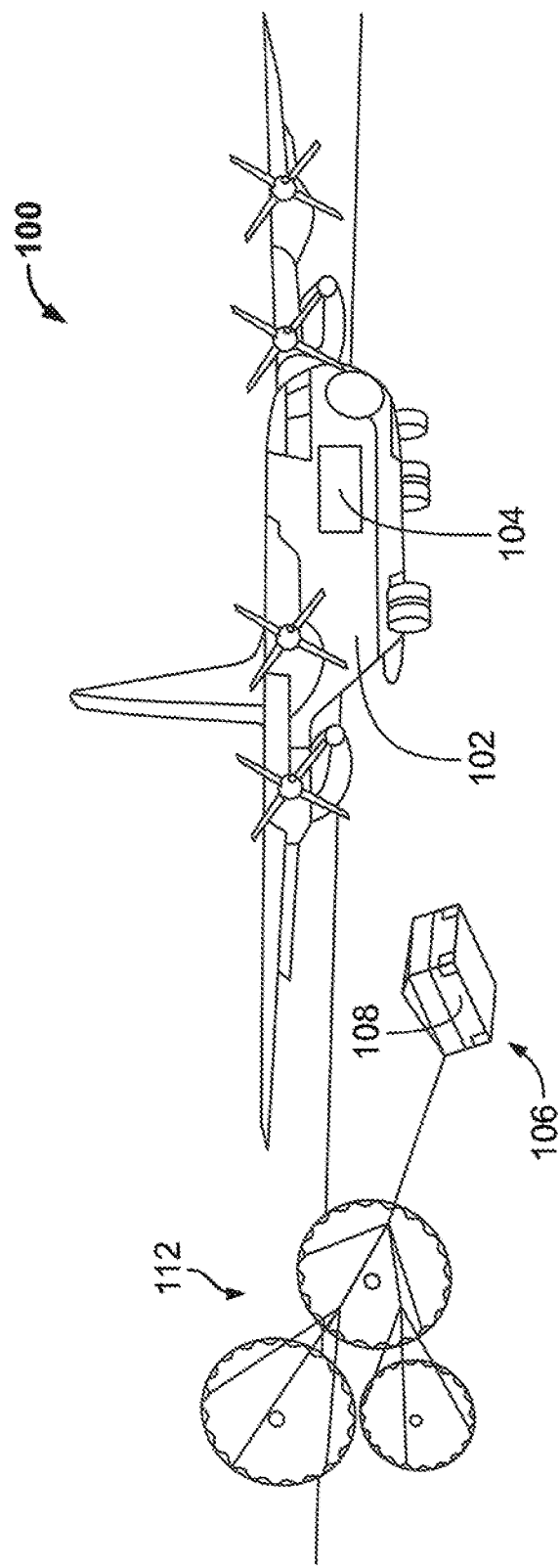
FIG. 1 depicts an aircraft and a released payload.

Referring to FIG. 1, an aircraft 100 is depicted therein. The aircraft 100 has a fuselage 102, and disposed within the fuselage 102 is an adaptive airdrop system 104. The adaptive airdrop system 104, which will be described in more detail momentarily, determines a more precise computer aided release point (CARP) for the payload 106 that is depicted as being airdropped from the aircraft 100. In the depicted embodiment, the payload 106 is a container delivery system (CDS) that includes one or more containers 108 coupled to a parachute 112. Although only one payload is depicted in FIG. 1, it will be appreciated that multiple payloads 106 could be airdropped from the aircraft 100.

Figure 2:
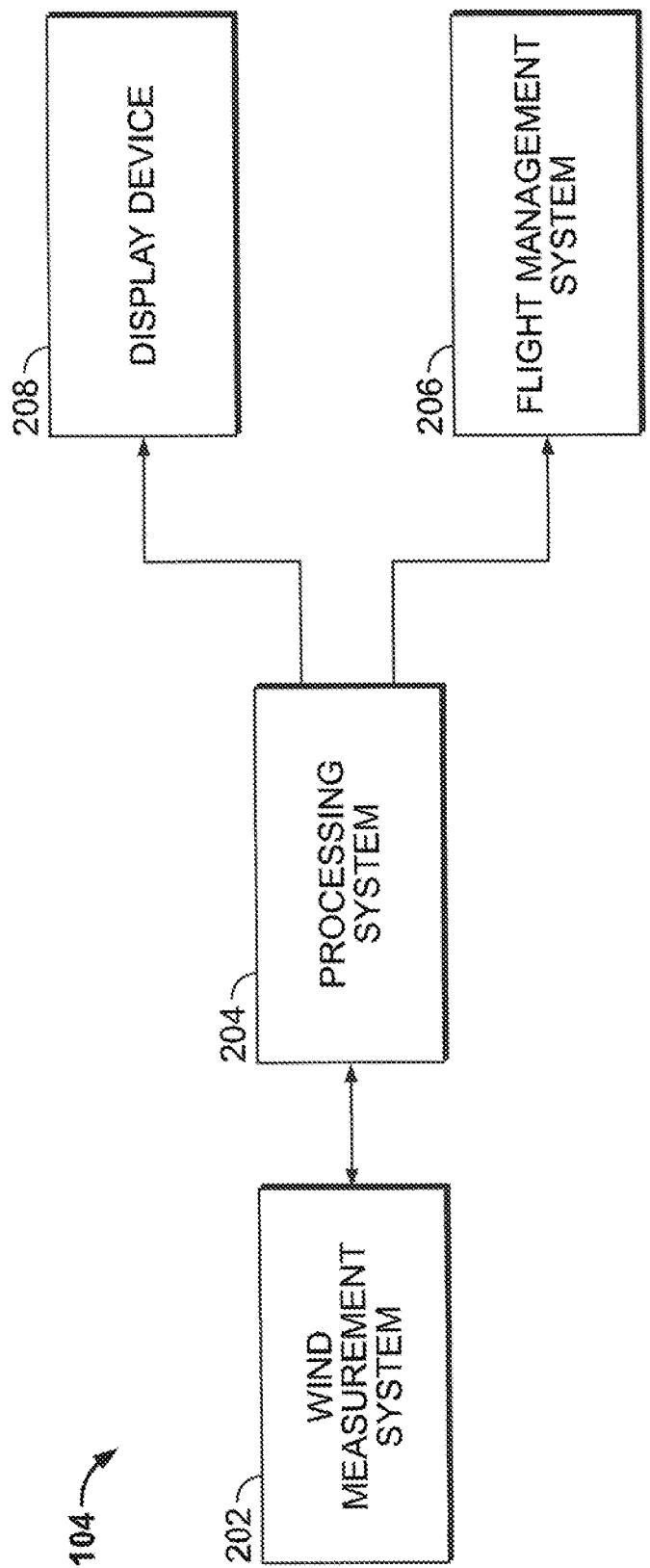
FIG. 2 depicts a functional block diagram of an adaptive airdrop system that may be implemented in the aircraft of FIG. 1.

Turning now to FIG. 2, a functional block diagram of the adaptive airdrop system 104 is depicted and will now be described. The adaptive airdrop system 104 includes at least a wind measurement system 202 such as, for example, an ultraviolet LIDAR (UV LIDAR) system 202, a processing system 204, a flight management system 206, and may also include a display device 208. The wind measurement system 202 is configured to measure various atmospheric conditions and supply data representative of the measured atmospheric conditions in a wide variety of environmental conditions and at altitudes from ground to the cruising altitude of most aircraft. When implemented using a UV LIDAR, the wind measurement system 202 makes these measurements without reliance on atmospheric particulates. The atmospheric conditions that the UV LIDAR system 202 measures may vary, but include at least atmospheric wind velocity. In some embodiments, the atmospheric conditions may also include one or more of temperature, density, pressure, and humidity.

The processing system 204 generally represents the hardware, circuitry, processing logic, and/or other components configured to facilitate communications and/or interaction between the elements of the adaptive airdrop system 104 and perform additional processes, tasks and/or functions to support operation of the adaptive airdrop system 104, as described in greater detail below. Depending on the embodiment, the processing system 204 may be implemented or realized with a general-purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 204 includes processing logic that may be configured to carry out the functions, techniques, and processing tasks associated with the operation of the adaptive airdrop system 104 described in greater detail herein. Furthermore, the steps of a method or algorithm described in connection with the embodiments disclosed herein may be embodied directly in hardware, in firmware, in a software module executed by the processing system 204, or in any practical combination thereof. In accordance with one or more embodiments, the processing system 204 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 204, cause the processing system 204 to execute and perform one or more of the processes, tasks, operations, and/or functions described herein.

With the above in mind, it is noted that the processing system 204 is in operable communication with, and is configured to adaptively sample the atmospheric data supplied by, the wind measurement system 202. The processing system 204 is additionally configured, based on the adaptively sampled atmospheric data, to calculate a precision computer aided release point (CARP) for the payload 106. The precision CARP is then supplied to the FMS 206 and, when included, may also be output for display on the display device 208.

The FMS 206, as is generally known, is a specialized computer that automates a variety of in-flight tasks such as in-flight management of the flight plan for the aircraft 100. Using various sensors, such as a global positioning system (GPS), the FMS determines the aircraft's position and guides the aircraft 100 along its flight plan using flight plan data including, for example, the precision CARP.

The adaptive sampling implemented in the processing system 204 is defined as continuously sampling the atmospheric data and supplying the continuously sampled atmospheric data to a Computer Aided Release Point (CARP) model 208 that is implemented in the processing system 204. The processing system 204 iteratively updates distal sampling locations and system resolution to progressively approach sampling along the modeled trajectory of the payload 106 as it falls after being airdropped. In a preferred embodiment, wind measurement system 202 and processing system 204 will estimate to as high degree as sensible/optimal—given operational timing and sensing/algorithmic latency constraints—to ensure an optimal CARP calculation that ensures the highest probability that the payload 106 lands near the intended target on the ground.

More specifically, the processing system 204 continuously samples the atmospheric data supplied from the UV LIDAR system 202, and the CARP model 208 calculates a CARP and the corresponding trajectory of the payload 106 if it is released from the CARP. The wind measurement system 202 then measures the atmospheric conditions along the projected trajectory, with a modified measurement location and spatial/temporal resolution, in order for the processing system 204 to optimally reduce the uncertainty of the CARP calculation. These steps progressively refine the CARP to a final CARP solution. This adaptive sampling and iterative CARP calculation assures, with high probability, that the aircraft 100 can successfully reach the CARP state (e.g., heading, altitude, airspeed, time of drop . . . ), and ensure the highest probability the CDS will be dropped at the right state and land nearest the target zone on the ground.

Figure 3:
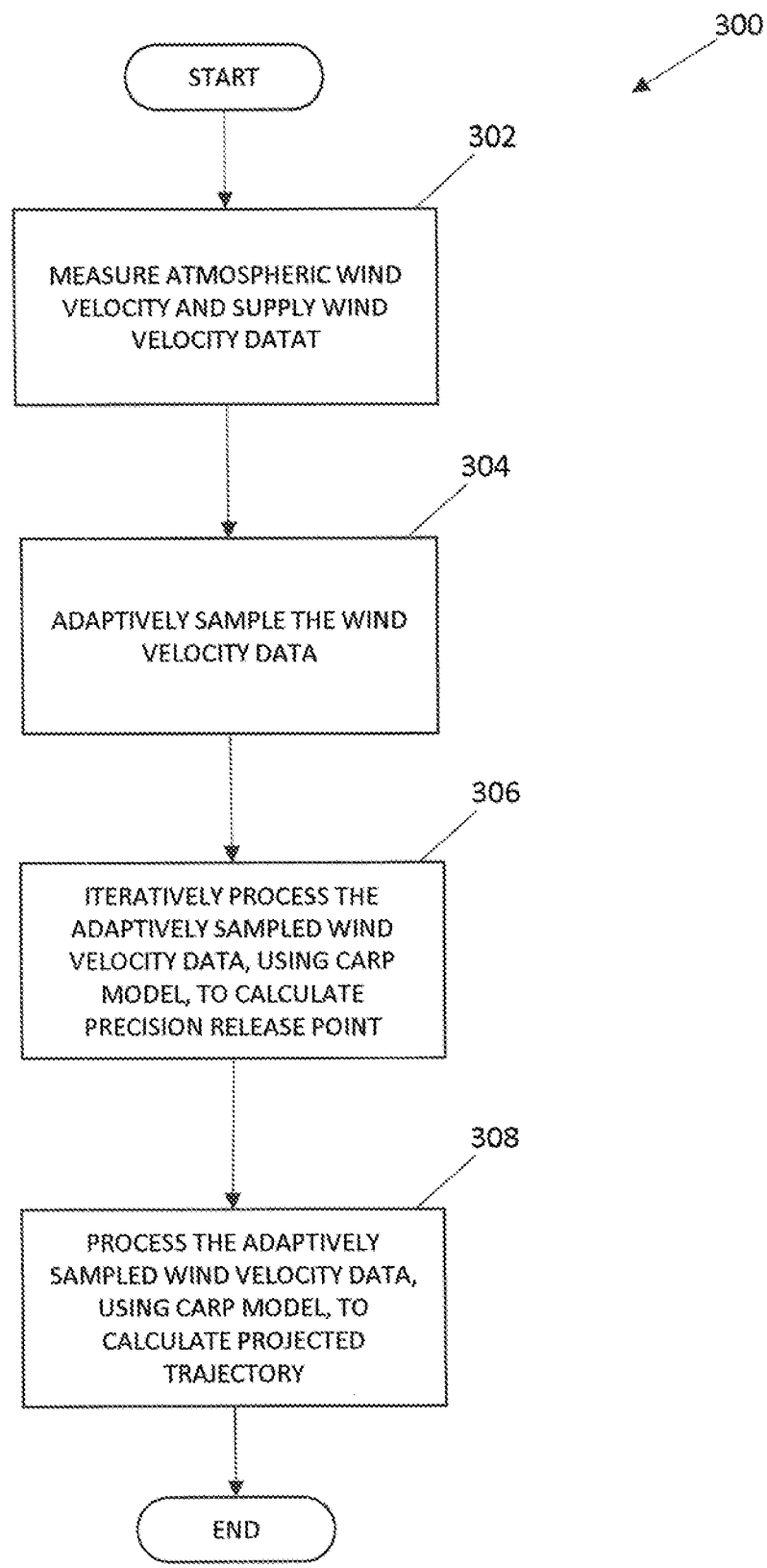
FIG. 3 depicts a method, in flowchart form, that may be implemented in the system of FIG. 2.

Having described the overall functionality of the system 104, a description of a method for detecting ground resonance and providing a warning that is implemented in the system 104 will be described. The method 300, which is depicted in flowchart form in FIG. 3, represents various embodiments of a method for adaptively computing precise CARP for aircraft. For illustrative purposes, the following description of method 300 may refer to elements mentioned above in connection with FIGS. 1 and 2. In practice, portions of method 300 may be performed by different components of the described system 104. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

The method 300 starts by measuring atmospheric wind velocity data (302) with the wind measurement system 202. Thereafter, the processing system 204 adaptively samples the wind velocity data (304), iteratively processes the adaptively sampled wind velocity data, using the CARP model, to calculation a precision release point (306), and processes the adaptively sampled wind velocity data, using the CARP model, to calculate a projected trajectory (308).

The optimization of measurement parameters can include the influences for atmospheric variability as a function of location on the airdrop uncertainty, signal level and measurement uncertainty as a function of measurement geometry, spatial/temporal resolution of the calculation, avoiding physical obscurations, as well as other parameters of interest.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention.

What is claimed is:

1. An adaptive airdrop system for an aircraft flying at a cruising altitude above ground, comprising:
   a wind measurement system configured to measure at least atmospheric wind velocity at a plurality of different altitudes from the ground to the cruising altitude of the aircraft and supply wind velocity data representative thereof;
   a processing system in operable communication with the wind measurement system and configured to:
   (i) adaptively sample the wind velocity data,
   (ii) implement a computer aided release point (CARP) model, and
   (iii) iteratively process the adaptively sampled wind velocity data to calculate, using the CARP model, a precision release point for a payload and a projected trajectory of the payload if it is released from the precision release point;
   and
   a flight management system (FMS) in operable communication with the processing system, the FMS configured to implement a flight plan, and further configured to:
   (i) receive data representative of the precision release point for the payload,
   (ii) update the flight plan to reflect the precision release point, and
   (iii) guide the aircraft along the updated flight plan,
   wherein the wind measurement system is further configured to:
   receive data representative of the projected trajectory of the payload from the processing system;
   measure at least the atmospheric wind velocity at different altitudes along the projected trajectory of the payload; and
   supply updated wind velocity data.

2. The system of claim 1, further comprising:
   a display device in operable communication with the processing system, the display device configured to at least selectively display the precision release point.

3. The system of claim 1, wherein the wind measurement system comprises an ultraviolet LIDAR (UV LIDAR) system.

4. The system of claim 1, wherein the wind measurement system is further configured to measure one or more of temperature, density, pressure, and humidity.

5. An adaptive airdrop system for an aircraft flying at a cruising altitude above ground, comprising:
   an ultraviolet LIDAR (UV LIDAR) system configured to measure one or more atmospheric conditions at a plurality of altitudes from the ground to the cruising altitude of the aircraft and supply atmospheric condition data representative thereof;
   a processing system in operable communication with the UV LIDAR system and configured to:
   (i) adaptively sample the atmospheric condition data,
   (ii) implement a computer aided release point (CARP) model, and
   (iii) iteratively process the adaptively sampled atmospheric condition data to calculate, using the CARP model, a precision release point for a payload and a projected trajectory of the payload if it is released from the precision release point;
   and
   a flight management system (FMS) in operable communication with the processing system, the FMS configured to implement a flight plan, and further configured to:
   (i) receive data representative of the precision release point for the payload,
   (ii) update the flight plan to reflect the precision release point, and
   (iii) guide the aircraft along the updated flight plan,
   wherein the UV LIDAR system is further configured to:
   receive data representative of the projected trajectory of the payload from the processing system;
   measure at least the atmospheric wind velocity at different altitudes along the projected trajectory of the payload; and
   supply updated wind velocity data.

6. The system of claim 5, further comprising:
   a display device in operable communication with the processing system, the display device configured to at least selectively display the precision release point.

7. The system of claim 5, wherein the one or more atmospheric conditions include wind velocity, temperature, density, pressure, and humidity.

8. An aircraft configured to fly at a cruising altitude above ground, comprising:
   a fuselage adapted to have a payload disposed therein; and
   a precision airdrop system disposed within the fuselage, the precision airdrop system comprising:
   a wind measurement system configured to measure at least atmospheric wind velocity at a plurality of altitudes from the ground to the cruising altitude of the aircraft and supply wind velocity data representative thereof;
   a processing system in operable communication with the wind measurement system and configured to:
   (i) adaptively sample the wind velocity data,
   (ii) implement a computer aided release point (CARP) model,
   and
   (iii) iteratively process the adaptively sampled wind velocity data to calculate, using the CARP model, a precision release point for the payload and a projected trajectory of the payload if it is released from the precision release point;
   and
   a flight management system (FMS) in operable communication with the processing system, the FMS configured to implement a flight plan, and further configured to:
   (i) receive data representative of the precision release point for the payload,
   (ii) update the flight plan to reflect the precision release point,
   and (iii) guide the aircraft along the updated flight plan,
wherein the wind measurement system is further configured to:
  receive data representative of the projected trajectory of the payload from the processing system;
  measure at least the atmospheric wind velocity at different altitudes along the projected trajectory of the payload; and
  supply updated wind velocity data.

9. The aircraft of claim 8, further comprising:
a display device disposed within the fuselage and in operable communication with the processing system, the display device configured to at least selectively display the precision release point.

10. The aircraft of claim 8, wherein the wind measurement system comprises an ultraviolet LIDAR (UV LIDAR) system.

11. The aircraft of claim 8, wherein the wind measurement system is further configured to measure one or more of temperature, density, pressure, and humidity.

* * * * *